US006869092B1

(12) United States Patent
Henn (10) Patent No.: US 6,869,092 B1
(45) Date of Patent: Mar. 22, 2005

(54) SLIDE-OUT DECK FOR A RECREATIONAL VEHICLE

(75) Inventor: Brian A. Henn, Phillips, NE (US)

(73) Assignee: Chief Industries, Inc., Grand Island, NE (US)

( * ) Notice: Subject to any disclaimer, the term of this patent is extended or adjusted under 35 U.S.C. 154(b) by 0 days.

(21) Appl. No.: 10/192,723

(22) Filed: Jul. 9, 2002

(51) Int. Cl.⁷ ................................................. B60R 3/00
(52) U.S. Cl. ...................................... 280/166; 296/162
(58) Field of Search ................................ 280/166, 163, 280/164.1, 164.2; 296/162

(56) References Cited

U.S. PATENT DOCUMENTS

| 3,515,406 A | | 6/1970 | Endsley, Jr. | |
| 3,796,456 A | | 3/1974 | Bergeson et al. | |
| 3,891,052 A | | 6/1975 | Lee, Sr. et al. | |
| 4,188,057 A | * | 2/1980 | Pauli | 296/162 |
| 4,347,638 A | | 9/1982 | Weaver | |
| 4,413,855 A | | 11/1983 | Flanagan | |
| 4,869,030 A | | 9/1989 | Clark | |
| 4,874,197 A | | 10/1989 | Grable | |
| 4,883,306 A | | 11/1989 | Stucky | |
| 5,154,569 A | * | 10/1992 | Eryou et al. | 414/495 |
| 5,193,878 A | | 3/1993 | Weaver | |
| 5,421,395 A | * | 6/1995 | Horn | 160/405 |
| D415,070 S | | 10/1999 | Tait | |
| 5,997,073 A | | 12/1999 | Vanderhoof | |
| 6,148,571 A | * | 11/2000 | Seyller | 52/200 |
| 6,502,893 B1 | * | 1/2003 | Corliss, Jr. | 296/162 |

FOREIGN PATENT DOCUMENTS

JP          10-217827      *  8/1998

* cited by examiner

*Primary Examiner*—Bryan Fischmann
(74) *Attorney, Agent, or Firm*—Thomte, Mazour & Niebergall; Dennis L. Thomte (57) ABSTRACT

A slide-out deck for a recreational vehicle such as a fifth wheel travel trailer with the deck being supported from the frame of the vehicle. The deck is slidably movable between a retracted position beneath the vehicle to an extended position at one side of the vehicle. The deck is movable either manually or by an electric gear motor or the like. A folding step is provided on the outer end of the deck which is movable between stowed and operative positions.

13 Claims, 7 Drawing Sheets

SLIDE-OUT DECK FOR A RECREATIONAL VEHICLE

BACKGROUND OF THE INVENTION

1. Field of the Invention

This invention relates to a slide-out deck for a recreational vehicle and more particularly to a completely assembled deck which is suspended from the main frame of the recreational vehicle.

2. Description of the Related Art

Recreational vehicles such as fifth wheel travel trailers normally comprise a wheeled frame having a coach or body provided thereon which has a door usually mounted on the right side thereof to enable persons to gain access to the interior of the coach. When the vehicle is being used for camping or the like, an awning is sometimes secured to the right side of the vehicle to provide shade for those persons sitting beside the vehicle. The ground at the side of the vehicle may be irregular, sandy, or even muddy, depending upon the conditions. Further, the height of the lower edge of the door above the ground makes it somewhat inconvenient for persons to enter the coach or be part of the interior of the coach.

Although retractable decks or patios have been previously provided for recreational vehicles, it is not believed that the prior art retractable decks are sufficiently strong or durable. Further, it is not believed that the prior art retractable decks are convenient to move between the retracted and extended positions.

SUMMARY OF THE INVENTION

A slide-out deck is provided for a recreational vehicle such as a fifth wheel travel trailer wherein the completely assembled deck is suspended from the main frame of the vehicle and which is movable between a retracted position and an extended position. When the deck is in its retracted position, it is stowed beneath the frame of the vehicle. When the deck is in its extended position, it extends from the side of the trailer at a predetermined location above the ground. The slide-out or retractable deck comprises spaced-apart front and rear support rails which are secured to the frame of the vehicle and which have deck supports movably mounted therein. The deck supports support deck modules which are comprised of a PVC material. The deck supports and the deck thereon are movable between extended and retracted positions by means of an electric gear motor. If desired, the deck may be moved between its extended and retracted positions in a manual fashion as well. A folding step is secured to the outer end of the deck and is movable between stowed and operative positions. The purpose of the retractable deck is to provide the user a residential-style approach to the recreational vehicle and improve entering and exiting the coach due to its height and the traditional method of climbing the steps by utilizing folding steps. The deck also increases the use of the awning of the recreational vehicle by providing a greater level of shade due to the elevated height of the deck and the proximity thereof to the awning location.

A principal object of the invention is to provide a slide-out or retractable deck for a recreational vehicle.

A further object of the invention is to provide a slide-out deck for a recreational vehicle which is mounted to the underside of the vehicle and which is movable from a retracted position beneath the vehicle to an extended position at one side thereof.

A further object of the invention is to provide a slide-out deck or porch for a recreational vehicle which is movable between retracted and extended positions by means of a gear motor.

Still another object of the invention is to provide a slide-out deck or porch for a recreational vehicle which is extremely strong and durable.

Still another object of the invention is to provide a slide-out deck or porch for a recreational vehicle including a folding step at the outer end thereof.

These and other objects of the invention will be apparent to those skilled in the art.

DESCRIPTION OF THE PREFERRED EMBODIMENT

Figure 1:
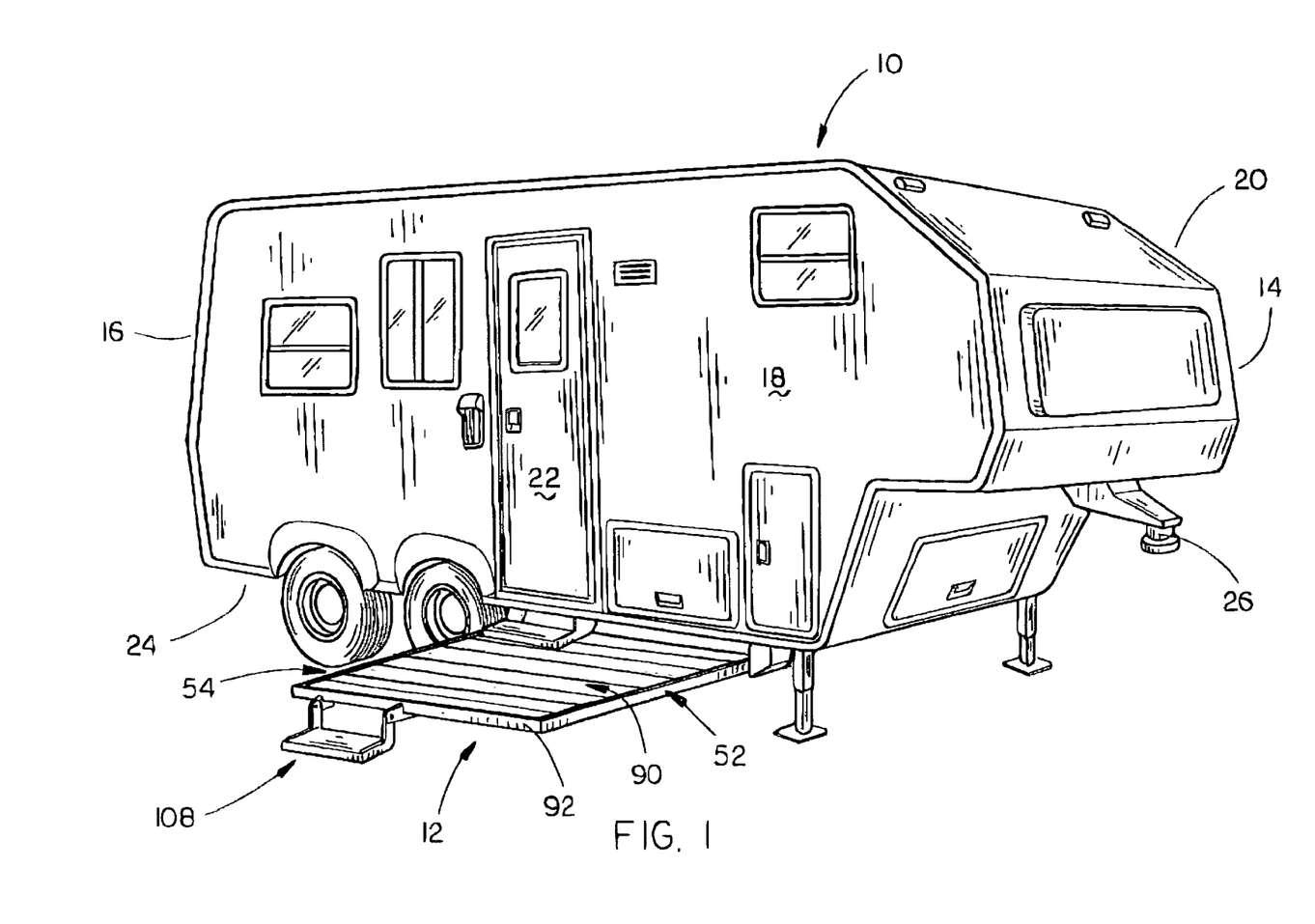
FIG. 1 is a front perspective view of a recreational vehicle having the slide-out deck of this invention mounted thereon.
Figure 2:
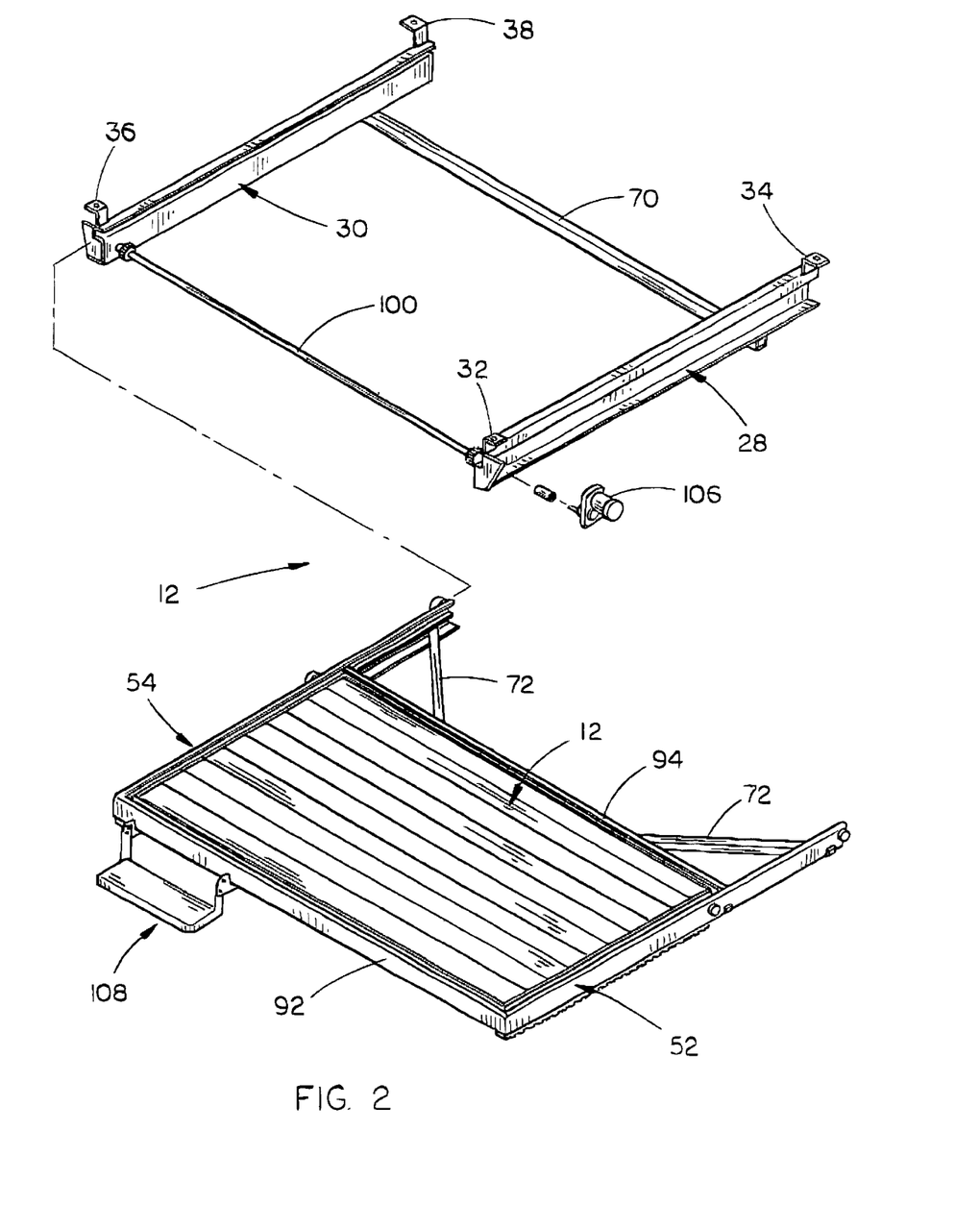
FIG. 2 is an exploded perspective view of the deck of this invention.
Figure 3:
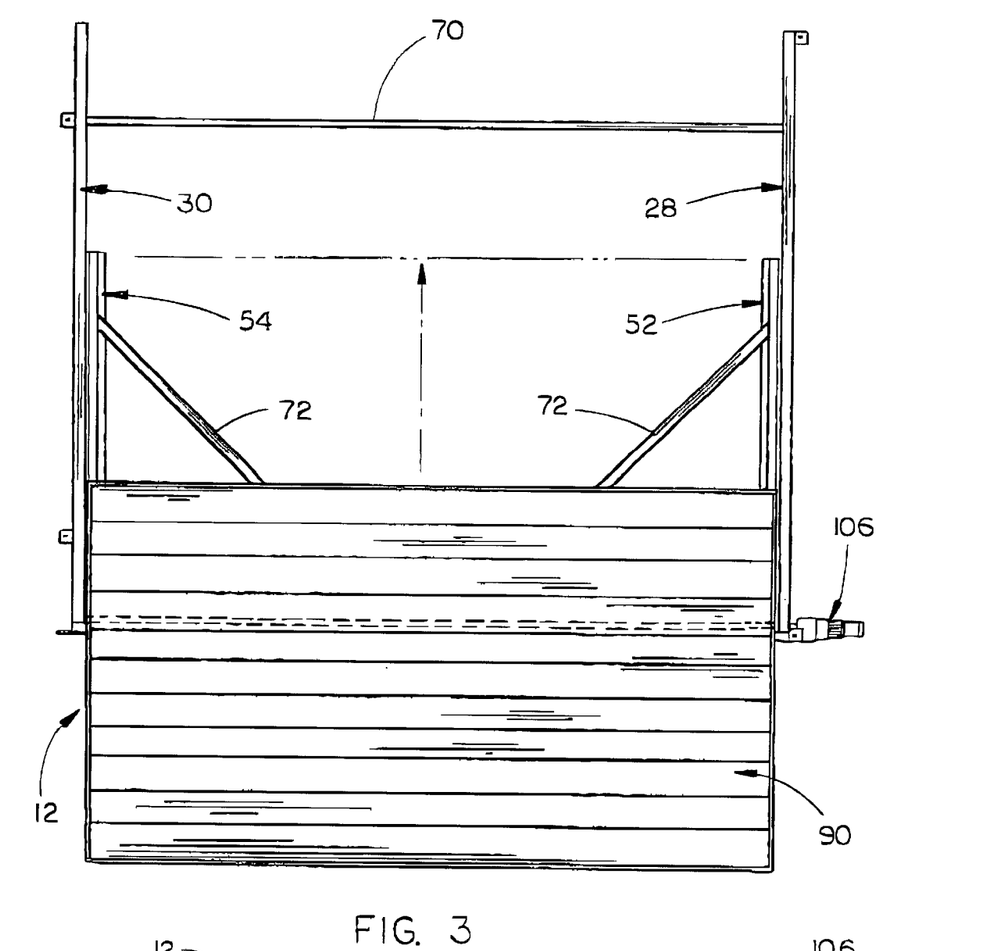
FIG. 3 is a top elevational view of the deck of this invention.
Figure 4:
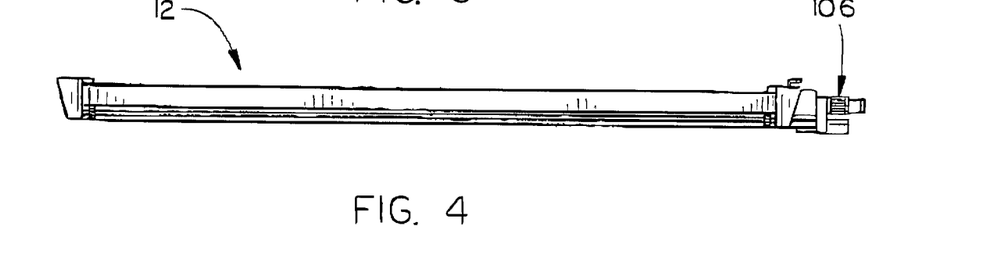
FIG. 4 is an end view of the slide-out deck of this invention.
Figure 5:
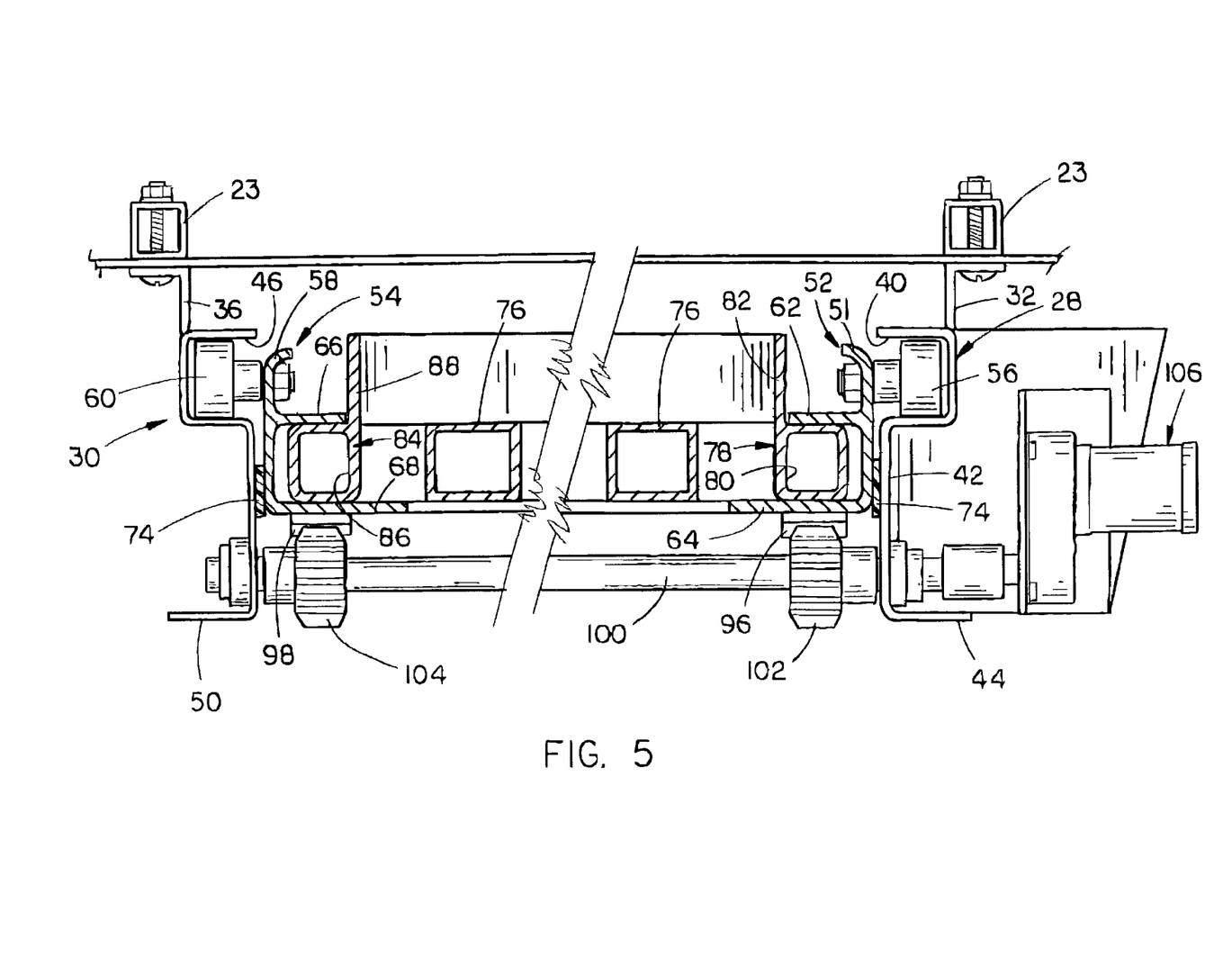
FIG. 5 is a partial vertical sectional view of the deck.
Figure 6:
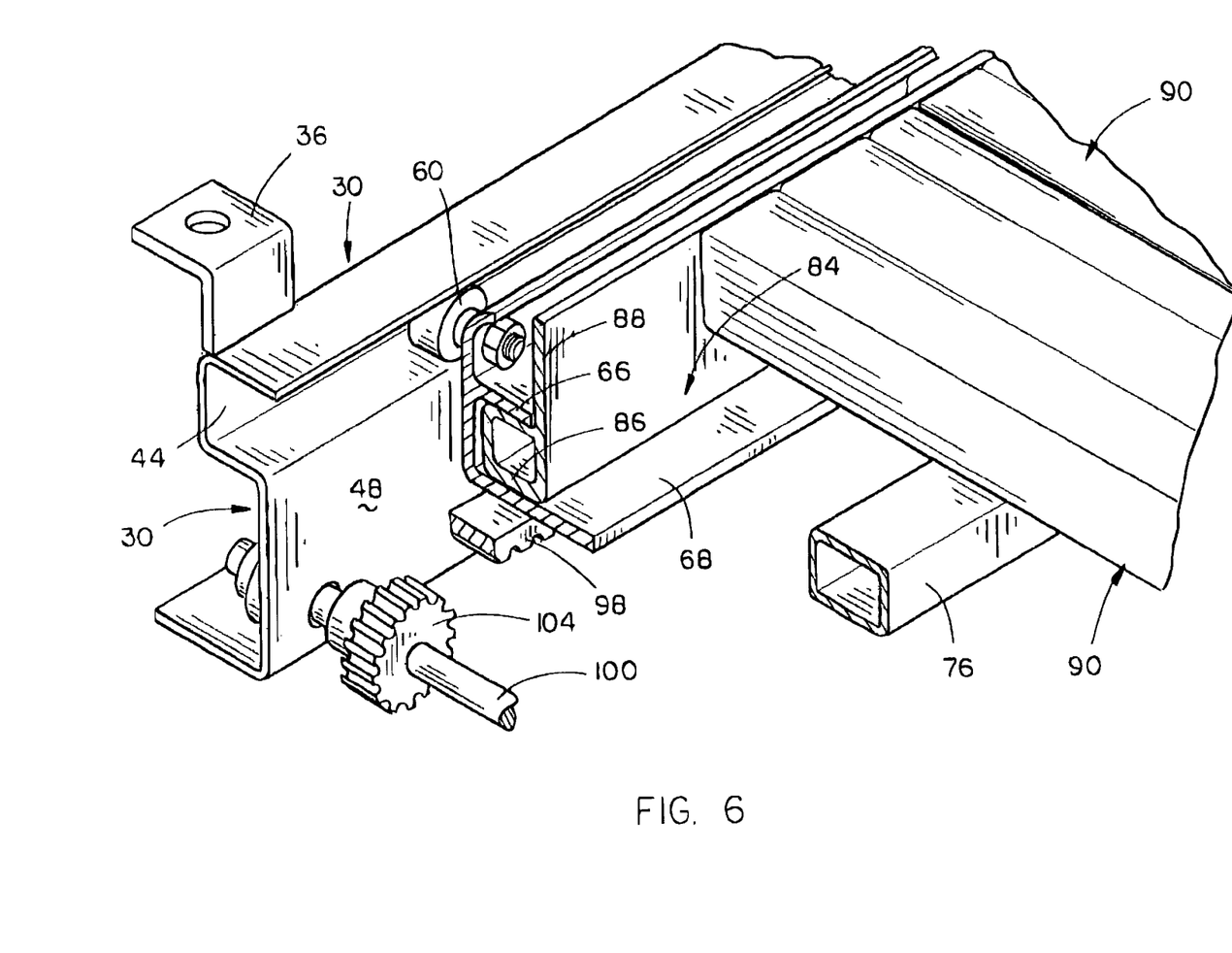
FIG. 6 is a partial perspective view of the deck with portions thereof cut away to more fully illustrate the invention.
Figure 7:
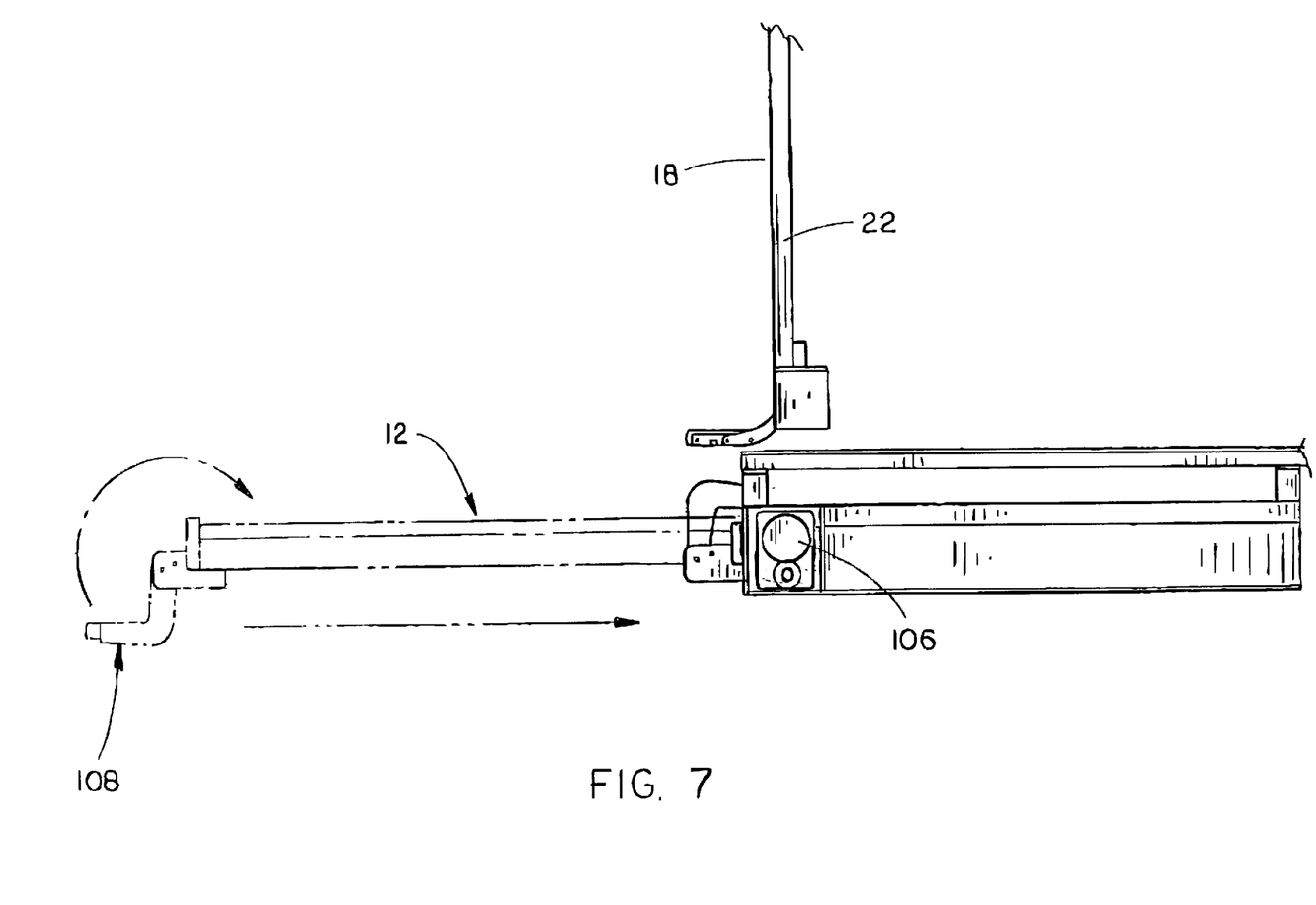
FIG. 7 is a partial front elevational view illustrating the deck in its retracted position with the broken lines illustrating the deck in its extended position.

The numeral 10 refers generally to a recreational vehicle such as a fifth wheel trailer. The numeral 12 refers generally to a retractable deck/patio ("deck") which is selectively movable between a retracted position beneath the underside of the vehicle to an extended position outwardly of one side thereof. Although a fifth wheel trailer is illustrated in the drawings, the deck 12 could be used with any type of recreational vehicle such as a conventional trailer home or even possibly a motor home. For purposes of description, vehicle 10 will be described as including a forward end 14, rearward end 16, and sides 18 and 20. Side 18 has a door 22 formed therein. Normally, the vehicle 10 will have a supporting frame 23 upon which the body of the trailer is positioned. As seen in FIG. 1, vehicle 10 includes wheels which are affixed to the frame of the vehicle 10 in conventional fashion. The bottom or underside 24 of the vehicle is spaced above the ground or other supporting surface. Vehicle 10 also includes a king pin 26 at its forward end for connection to the fifth wheel of a truck or the like. Deck 12 includes a pair of elongated support rails which will be described as a front support rail 28 and a rear support rail 30 which extend transversely with respect to the length of the trailer. Rails 28 and 30 are secured to the frame 23 of the vehicle at the underside thereof by any conventional means such as by the brackets 32, 34 and 36, 38, respectively, as seen in FIGS. 2 and 5. Brackets 32, 34 and 36, 38 are welded to the rails 28 and 30, respectively.

Rail 28 includes a rearwardly facing channel 40, a substantially vertically disposed wall 42, and a forwardly extending flange 44. Rail 30 includes a forwardly facing channel 46, a substantially vertically disposed wall 48, and a rearwardly extending flange 50. Rails 28 and 30 are preferably formed from stamped metal.

The numerals 52 and 54 refer to transversely extended deck supports which are preferably formed of extruded metal such as aluminum or the like. Support 52 includes an upper end 51 which has a plurality of spaced-apart track rollers 56 secured thereto which are received by the channel 40 of rail 28 (FIG. 5). Support 54 has an upper end 58 which has a plurality of spaced-apart track rollers 60 secured thereto which are received by the channel 46 of rail 30 (FIG. 5). Support 52 includes a pair of vertically spaced flanges 62 and 64, as seen in FIG. 5. Support 54 also includes a pair of vertically spaced flanges which are designated as 66 and 68, respectively. Brace 70 is secured to the inner ends of rails 28 and 30 and extends therebetween, as seen in FIG. 2. Cross bracing 72 is secured to and extends between supports 52 and 54 as needed. As seen in FIG. 5, it is preferred that sub blocks or members 74 are positioned between rail 28 and support 52 and between rail 30 and support 54.

A plurality of transversely extending support tubes 76 are positioned upon, and preferably secured to, the cross bracing 72 between supports 52 and 54. An extruded metal end cap 78 including a tubular portion 80 and a vertical wall portion 82 is positioned with respect to the support 52, as seen in FIG. 5, so that tubular portion 80 is received between the flanges 62 and 64. Similarly, an extruded metal end cap 84 including tubular portion 86 and vertical wall portion 88 is positioned with respect to the support 54 so that tubular portion 84 is received between flanges 66 and 68 of support 54. A plurality of extruded deck modules 90 are positioned upon the tubular supports 76 between walls 82 and 88 of end caps 78 and 84, respectively. A vertically disposed plate 92 is secured to the outer ends of support 52 and 54 to maintain the deck modules 90 in position. Plate 94 is secured to and extends between support 52 and 54 outwardly of the inner ends thereof to maintain the deck modules 90 in place.

Elongated gear racks 96 and 98 are secured to the undersides of flanges 64 and 68 of supports 52 and 54, respectively, as seen in FIG. 5. Shaft 100 is rotatably mounted in and extends between walls 42 and 48 of rails 28 and 30, respectively, and has gears or sprockets 102 and 104 mounted thereon for rotation therewith which are in mesh with gear racks 96 and 98, respectively. Electric gear motor 106 is operatively connected to shaft 100 for rotating shaft 100 in opposite directions to extend the deck 12 from its retracted position to its extended position and to retract the deck from its extended position as desired. Although it is preferred that an electric gear motor 106 be used to extend and retract the deck 12, a crank arm or the like could be connected to the shaft 100 to manually extend and retract the deck. Further, in some cases, the deck could be manually pulled from its retracted position to its extended position and could be pushed from its extended position to its retracted position. In such a case, the motor 106, shaft 100 and gear racks 96 and 98 would be omitted.

Figure 8:
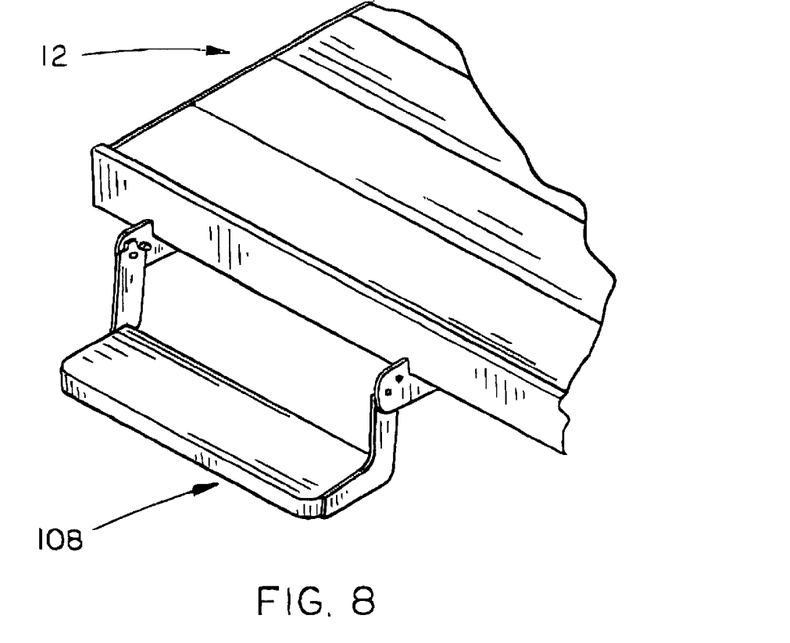
FIG. 8 is a perspective view illustrating a folding step secured to the outer end of the deck with the step in its operative position.
Figure 9:
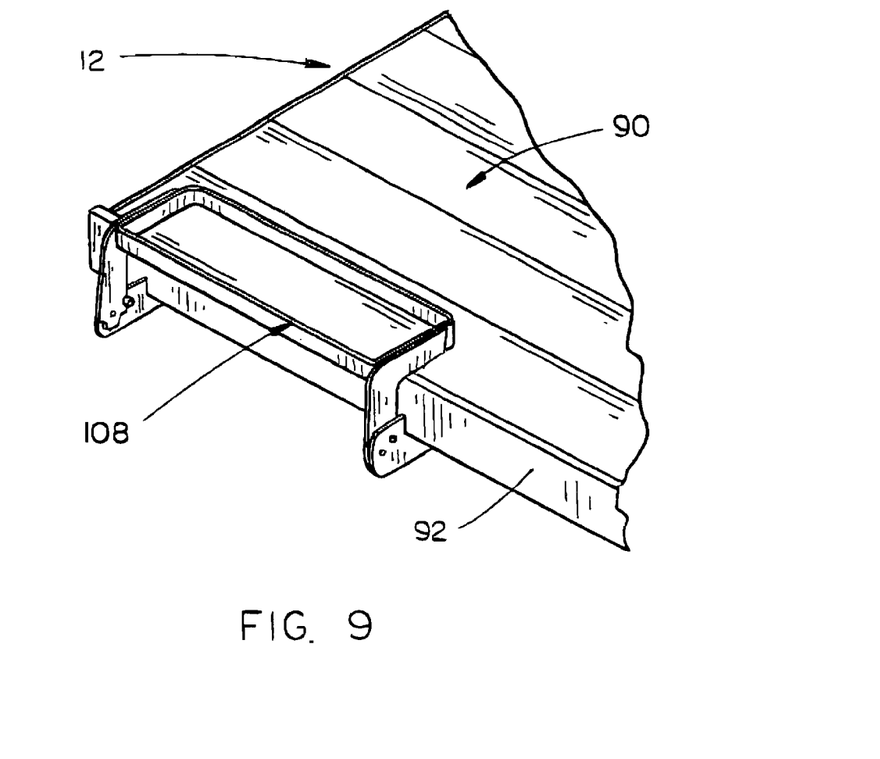
FIG. 9 is a view similar to FIG. 8 except that the step has been folded to its stowed position.

It is preferred that a retractable or folding step 108 be secured or incorporated into the deck 12 so that the step 108 may be selectively pivoted between its operative and folded positions, as illustrated in the drawings.

Thus it can be seen that a novel slide-out deck has been provided for a recreational vehicle. The deck is extremely durable in use and is sufficiently strong so as to support a number of persons thereon. The aluminum and PVC construction of the deck makes the deck extremely durable in use. The deck is easily movable between the extended and retracted positions and provides the user a residential-style approach to the recreational vehicle. The deck also improves entering and exiting the coach by positioning the deck between the lower end of the door and the ground. The deck also increases the use of the awning of the recreational vehicle by providing a greater level of shade by the elevated height of the deck in a closer proximity to the awning location.

Thus it can be seen that the invention accomplishes at least all of its stated objectives.

I claim:

1. A retractable deck for a recreational vehicle having a forward end, a rearward end, opposite sides, a door in one of said sides, and an underside which is spaced above a support surface, comprising:

front and rear transversely extending support rails secured to the underside of the vehicle having inner ends positioned beneath the vehicle and outer ends which are positioned adjacent the side of the vehicle in which the door is mounted;

each of said support rails having upper and lower ends;

said front and rear support rails having a channel; each of said front and rear support rails having a substantially vertically disposed wall portion extending downwardly from each channel;

a deck support having inner and outer ends, a forward side and a rearward side;

said deck support including front and rear deck supports which are movably mounted on said front and rear support rails, respectively;

a substantially horizontally disposed deck secured to and extending between said front and rear deck supports;

said front and rear deck supports and said deck secured thereto being selectively movably mounted between a retracted position below the underside of the vehicle and an extended position wherein said deck is positioned outwardly of the said one side of the vehicle.

2. The deck of claim 1 wherein a power means is connected to said deck for moving said deck between its retracted and extended positions.

3. The deck of claim 2 wherein said power means comprises an electric motor.

4. The deck of claim 1 wherein a step structure is provided on said deck which extends downwardly from said deck towards the supporting surface.

5. The deck of claim 4 wherein said step structure is movable between stowed and operative positions.

6. A retractable deck for a recreational vehicle having a forward end, a rearward end, opposite sides, a door in one of said sides, and an underside which is spaced above a support surface, comprising:

front and rear transversely extending support rails secured to the underside of the vehicle having inner ends positioned beneath the vehicle and outer ends which are positioned adjacent the side of the vehicle in which the door is mounted;

each of said support rails having upper and lower ends;

said front support rail having a rearwardly facing channel at its upper end; said rear support rail having a forwardly facing channel at its upper end; each of said front and rear support rails having a substantially vertically disposed wall portion extending downwardly from the lower end of each channel thereon;

a rear deck support having a rearward side and a front deck support having a forward side;

said rearward side of said rear deck support having a plurality of rollers extending therefrom which are movably received in said channel on said rear support rail; said forward side of said front deck support having a plurality of rollers extending therefrom which are movably received in said channel in said front support rail;

a horizontally extending support means extending between said front and rear deck supports;

said deck being supported on said horizontally extending support means;

said deck being movable between a retracted position below the underside of the vehicle and an extended position wherein said deck is positioned outwardly of the said one side of the vehicle.

7. The deck of claim 6 wherein a power means is connected to said deck for moving said deck between its retracted and extended positions.

8. The deck of claim 6 wherein a step structure is provided on said deck which extends downwardly from said deck towards the supporting surface.

9. The deck of claim 8 wherein said step structure is movable between stowed and operative positions.

10. The deck of claim 6 wherein each of said deck supports has a downwardly facing gear rack thereon; a shaft rotatably mounted in and extending between said substantially vertically disposed wall portions of said front and rear support rails; a pair of gears mounted on said shaft for rotation therewith which are in engagement with said gear racks; and means for rotating said shaft and said gears to move said deck between its said extended and retracted positions.

11. The deck of claim 10 wherein said means for rotating said shaft comprises an electric motor operatively connected thereto.

12. The deck of claim 11 wherein said motor is a gear motor.

13. The deck of claim 6 wherein said deck comprises a plurality of extruded deck members.

* * * * *